(12) United States Patent
Haugen

(10) Patent No.: US 11,130,076 B2
(45) Date of Patent: Sep. 28, 2021

(54) OIL-GAS SEPARATORS COMPRISING NON-CONCENTRIC FLUID CHANNELS

(71) Applicant: DH Well Solutions, LLC, Dickinson, ND (US)

(72) Inventor: Dylan Haugen, Dickinson, ND (US)

(73) Assignee: DH Well Solutions, LLC, Dickinson, ND (US)

( * ) Notice: Subject to any disclaimer, the term of this patent is extended or adjusted under 35 U.S.C. 154(b) by 0 days.

(21) Appl. No.: 16/129,733

(22) Filed: Sep. 12, 2018

(65) Prior Publication Data

US 2020/0078706 A1 Mar. 12, 2020

(51) Int. Cl.
*E21B 43/38* (2006.01)
*B01D 19/00* (2006.01)

(52) U.S. Cl.
CPC .......... *B01D 19/0047* (2013.01); *E21B 43/38* (2013.01); *B01D 2221/04* (2013.01)

(58) Field of Classification Search
CPC .. E21B 43/38; B01D 19/0047; B01D 2221/04
See application file for complete search history.

(56) References Cited

U.S. PATENT DOCUMENTS

| 4,366,861 | A | * | 1/1983 | Milam | .................... F04B 47/02 |
| | | | | | 166/105.5 |
| 4,676,308 | A | | 6/1987 | Chow et al. | |
| 6,932,160 | B2 | | 8/2005 | Murray et al. | |
| 7,104,321 | B2 | | 9/2006 | Carruth | |
| 2005/0241826 | A1 | * | 11/2005 | Pratt | .................... E21B 43/006 |
| | | | | | 166/265 |
| 2011/0278015 | A1 | * | 11/2011 | Mazzanti | .............. E21B 43/121 |
| | | | | | 166/372 |

* cited by examiner

*Primary Examiner* — Brad Harcourt
(74) *Attorney, Agent, or Firm* — Elevated IP, LLC

(57) ABSTRACT

Oil-gas separators and methods of using the oil-gas separators are disclosed. An exemplary oil-gas separator comprises a first fluid channel for receiving a well fluid, the first fluid channel having an open proximal end, a sealed distal end, and a plurality of perforations in a distal portion of the first fluid channel's exterior wall for expelling well fluid comprising oil and entrained gas into an annular space between the oil-gas separator and a well casing to produce gas-reduced oil and a second fluid channel for receiving the gas-reduced oil, the second fluid channel having a sealed proximal end, an open distal end for expelling the gas-reduced oil to the Earth's surface, and a plurality of perforations in a proximal portion of the second fluid channel's exterior wall for receiving fluid from the annular space.

18 Claims, 3 Drawing Sheets

OIL-GAS SEPARATORS COMPRISING NON-CONCENTRIC FLUID CHANNELS

CROSS-REFERENCE TO RELATED APPLICATIONS

None.

STATEMENT REGARDING FEDERALLY SPONSORED RESEARCH

None.

BACKGROUND

In oil and gas wells, it is often desirable to separate gases and liquids so that the liquids may be efficiently pumped to the surface. Otherwise, entrained gases can become trapped in the pump causing a "gas lock" that reduces stroke volume, increases pump operating temperatures, and eventually stops production.

To address these drawbacks, a variety of devices have been developed for the downhole separation of liquids and gases. For example, U.S. Pat. Nos. 4,676,308 and 6,932,160 describe open-ended riser tubes or spill-over tubes that expel an oil-gas mixture into a well casing, where the gas rises and the liquid falls onto the well floor to be taken up in a separate tube leading to the surface. However, these open-ended, upward-pointing tubes complicate retrieval of downhole equipment and fishing operations. A closed-ended separator is described in U.S. Pat. No. 7,104,321, which describes devices with concentric tubes coupled together by an adaptor containing inlets to both the outer tube and the inner tube. Well fluid flows through the adaptor into the outer tube, which is slotted at its upper end to allow liquids and gases that are introduced into the outer tube to escape into the borehole or casing. The liquids, which fall back into the wellbore after being discharged from the outer tube, are then drawn through a port in the adaptor into the inner tube and pumped to the surface. However, the inlet holes of the adaptor are prone to clogging and frequently require expensive repairs and production downtime.

SUMMARY

The present invention generally relates to oil-gas separators for reducing the amount of entrained gas within well fluid. The disclosed devices are of simple and durable construction, are not prone to clogging, and provide significantly higher flow rates than existing devices, which translates into increased oil production and profits.

In an aspect, an oil-gas separator for use in a tubing string located in a borehole of a well comprises a first fluid channel for receiving a well fluid, the first fluid channel having an open proximal end, a sealed distal end, and a plurality of perforations in a distal portion of the first fluid channel's exterior wall for expelling well fluid comprising oil and entrained gas into an annular space between the oil-gas separator and a well casing to produce gas-reduced oil and a second fluid channel for receiving the gas-reduced oil, the second fluid channel having a sealed proximal end, an open distal end for expelling the gas-reduced oil to the Earth's surface, and a plurality of perforations in a proximal portion of the second fluid channel's exterior wall for receiving fluid from the annular space.

In an embodiment, the first fluid channel's exterior wall and the second fluid channel's exterior wall are formed by a sheath. In an embodiment, the sheath is a multi-part sheath or the sheath is an integral sheath. In an embodiment, the plurality of perforations in the distal portion and/or the plurality of perforations in the proximal portion are within a pup joint of the multi-part sheath.

In an aspect, an oil-gas separator for use in a tubing string located in a borehole of a well comprises longitudinally offset first and second fluid channels surrounded lengthwise by a sheath, the sheath comprising end caps and perforated external walls that substantially enclose offset areas of the fluid channels.

In an embodiment, a sheath is a multi-part sheath and each end cap and perforated external wall are within a pup joint of the sheath.

In an embodiment, an open proximal end of the first fluid channel has a lateral dimension greater than or equal to 1.38 inches, or greater than or equal to 1.75 inches, or greater than or equal to 2 inches, or greater than or equal to 2.5 inches, or greater than or equal to 3 inches, or greater than or equal to 4 inches, or greater than or equal to 5 inches or greater than or equal to 6 inches.

In an embodiment, a first fluid channel and a second fluid channel have lateral dimensions greater than or equal to 1.38 inches, or greater than or equal to 1.75 inches, or greater than or equal to 2 inches, or greater than or equal to 2.5 inches, or greater than or equal to 3 inches, or greater than or equal to 4 inches, or greater than or equal to 5 inches or greater than or equal to 6 inches.

In an embodiment, an oil-gas separator is enclosed within a well casing such that an annular space is formed between the exterior wall of the oil-gas separator and the internal wall of the well casing.

In an embodiment, an oil-gas separator does not comprise an adapter including a first inlet hole in fluid communication with a first fluid channel and a second inlet hole in fluid communication with a second fluid channel.

In an embodiment, a first fluid channel and a second fluid channel share a common wall, such as an internal wall. In an embodiment, longitudinal axes of a first fluid channel and a second fluid channel are oriented substantially parallel with one another. In an embodiment, a first fluid channel and a second fluid channel each have D-shaped lateral cross sections. In an embodiment, a first fluid channel and a second fluid channel are non-concentric with respect to one another. In an embodiment, an oil-gas separator is characterized by a shape that is substantially symmetrical. For example, an oil-gas separator as described herein may be substantially symmetrical when rotated 180 degrees around an axis perpendicular to the longitudinal axes of first and second fluid channels.

In an embodiment, perforations of a first and/or second fluid channel are disposed above a packer. In an embodiment, perforations are substantially round, substantially oval, substantially rectangular, substantially trapezoidal, substantially rhombohedral or a combination thereof.

In an embodiment, a first fluid channel comprises an agitator disposed within the distal portion of the fluid channel. For example, helical vanes, non-helical vanes, corrugated walls and/or protrusions inside a first fluid channel near one or more perforations may agitate well fluid exiting the perforations. In an embodiment, narrow slots may be used to agitate fluid exiting the slots.

In an embodiment, an average flow rate out of a second fluid channel is between 2250 bbl/day and 10,000 bbl/day, or between 2500 bbl/day and 8500 bbl/day, or between 2750 bbl/day and 7500 bbl/day, or between 3000 bbl/day and 5000 bbl/day, or between 3500 bbl/day and 4500 bbl/day. In an embodiment, an average flow rate out of a second fluid channel is at least 2250 bbl/day, or at least 2500 bbl/day, or at least 2750 bbl/day, or at least 3000 bbl/day, or at least 3500 bbl/day, or at least 4000 bbl/day.

In an embodiment, an initial flow rate into a first fluid channel is at least 2250 bbl/day, or at least 2500 bbl/day, or at least 2750 bbl/day, or at least 3000 bbl/day, or at least 3500 bbl/day, or at least 4000 bbl/day.

In an embodiment, an oil-gas separator is formed of a material selected from the group consisting of stainless steel, carbon steel, alloy steel, tool steel and combinations thereof.

In an aspect, a method of using an oil-gas separator to remove gas from a well fluid comprises flowing well fluid from below a barrier in a well into a first fluid channel of an oil-gas separator; causing the well fluid to be discharged from a plurality of perforations in an exterior wall of the first fluid channel and to flow downward, due to gravity, into an annular space between the oil-gas separator and an internal wall of a well casing, thereby releasing some of the gas contained within the well fluid to produce gas-reduced oil; flowing the gas-reduced oil from the annular space into a plurality of perforations in a proximal portion of a second fluid channel of the oil-gas separator; and delivering the gas-reduced oil to the Earth's surface through the second fluid channel.

BRIEF DESCRIPTION OF THE DRAWINGS

Illustrative embodiments of the present invention are described in detail below with reference to the attached drawings, wherein.

DETAILED DESCRIPTION

In general, the terms and phrases used herein have their art-recognized meaning, which can be found by reference to standard texts, journal references and contexts known to those skilled in the art. The following definitions are provided to clarify their specific use in the context of this description.

A "device" is a combination of components operably connected to produce one or more desired functions.

A "component" is used broadly to refer to an individual part of a device.

As used herein, a longitudinal dimension is the longest dimension of a device or component, and a lateral dimension is perpendicular to the longitudinal dimension. A lateral dimension is typically a cross section of the longitudinal dimension.

"Integral" refers to items or components that are unitary in structure. For example, unitary items or components may be formed as a single structure or unitary body. Items or components that are not integral or unitary form at least two distinct structures that are separate or easily separated from one another.

As used herein, an "external wall" is a wall forming an outer perimeter of the oil-gas separator or a wall that directly abuts an annular space formed by the oil-gas separator and the well casing.

As used herein, an "internal wall" is a wall that is partially or completely within an oil-gas separator cavity.

"Proximal" and "distal" refer to the relative positions of two or more objects, planes or surfaces. For example, an object that is close in space to a reference point relative to the position of another object is considered proximal to the reference point, whereas an object that is further away in space from a reference point relative to the position of another object is considered distal to the reference point.

The terms "direct and indirect" describe the actions or physical positions of one object relative to another object. For example, an object that "directly" acts upon or touches another object does so without intervention from an intermediary. Contrarily, an object that "indirectly" acts upon or touches another object does so through an intermediary (e.g., a third component).

Figure 1:
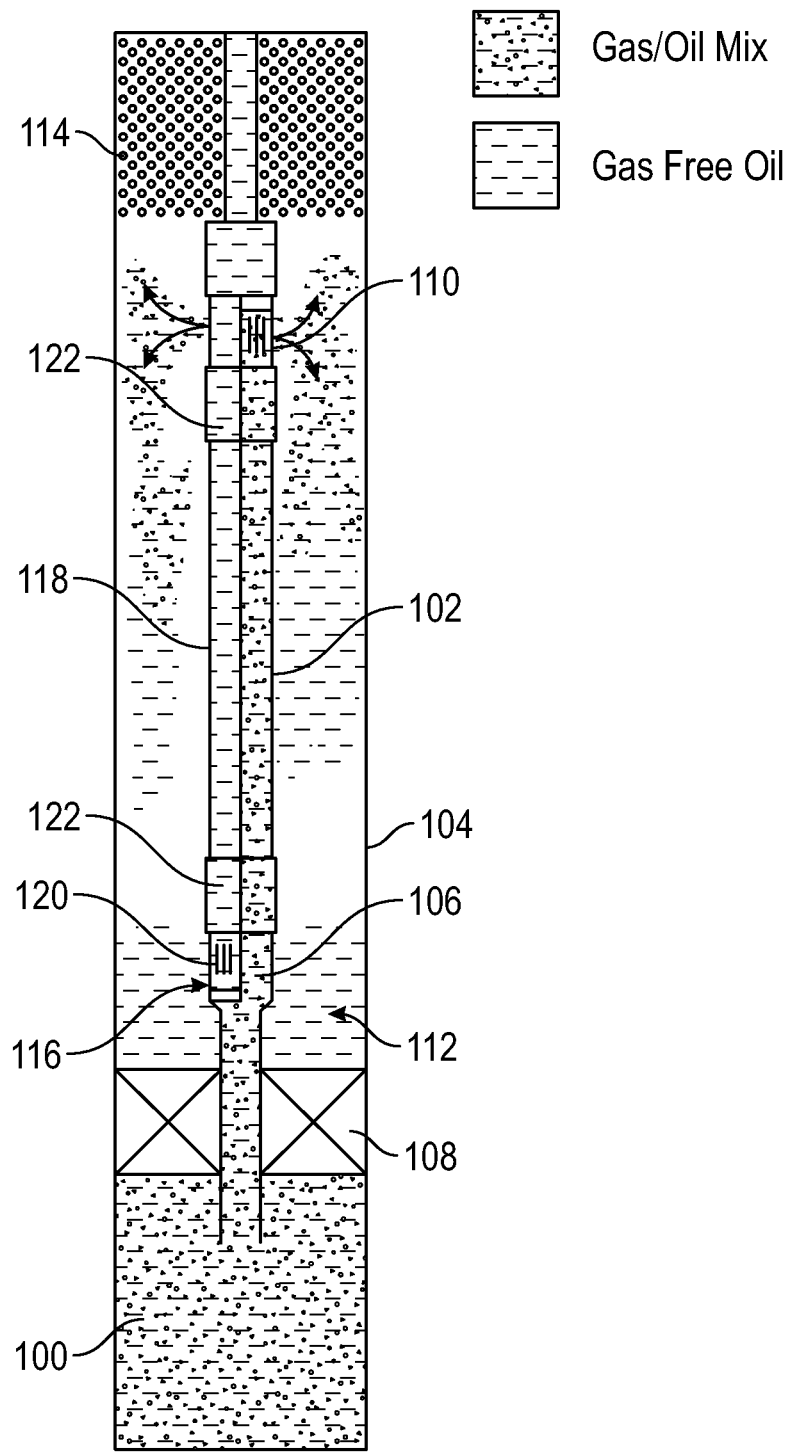
FIG. 1 is a schematic demonstrating flow of a well fluid through an exemplary oil-gas separator.

FIG. 1 is a schematic demonstrating flow of a well fluid 100 through an exemplary oil-gas separator 102 disposed within a well casing 104. Well fluid 100 enters a first fluid channel 106 through an open proximal end disposed below a packer 108 and travels upwards toward a sealed distal end of first fluid channel 106. Perforations 110 in an external wall of first fluid channel 106 allow well fluid 100 to be dispersed into an annular space 112 between oil-gas separator 102 and well casing 104. During the dispersion of well fluid 100 from perforations 110, gas 114 rises and escapes the wellbore and gas-reduced liquid 116 falls onto the surface of packer 108 due to gravity. Gas-reduced liquid 116 enters a second fluid channel 118 through perforations 120 in an external wall of second fluid channel 118 and is expelled through an open distal end of second fluid channel 118 to the Earth's surface. In an embodiment, proximal and distal regions of the fluid channels may be formed as pup joints 122.

Figure 2:
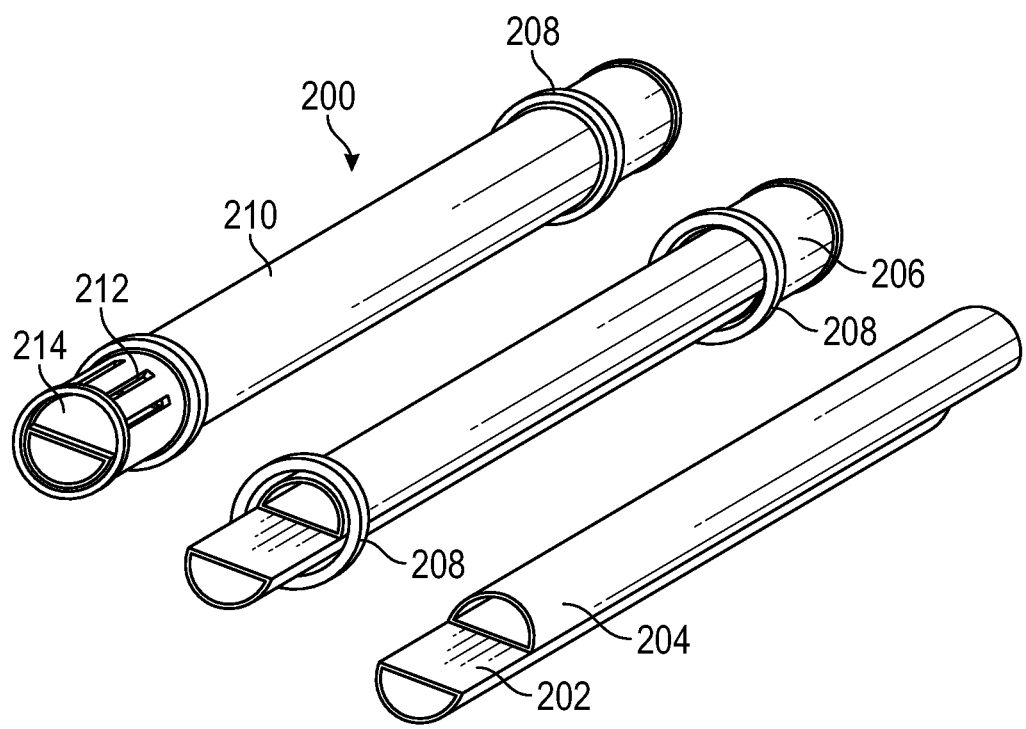
FIG. 2 illustrates multiple perspective views of an exemplary oil-gas separator at various stages of assembly.

FIG. 2 illustrates multiple perspective views of an exemplary oil-gas separator 200 at various stages of assembly. Offset first 202 and second 204 fluid channels, having D-shaped cross sections, are shown in the rightmost view of FIG. 2. In the middle view, a pup joint 206 covers the offset or void area where second fluid channel 204 extends past first fluid channel 202. Locking rings 208 are used to join pup joint 206 to an additional portion of a sheath 210 that surrounds first and second fluid channels 202, 204. Perforations 212, such as vertical slots, are formed in pup joint 206 and an end cap 214 seals the offset or void area to force fluid through perforations 212. Perforations on the opposite end of oil-gas separator 200 are rotated approximately 180 degrees relative to perforations 212 shown, thereby forming a substantially symmetrical oil-gas separator.

Figure 3:
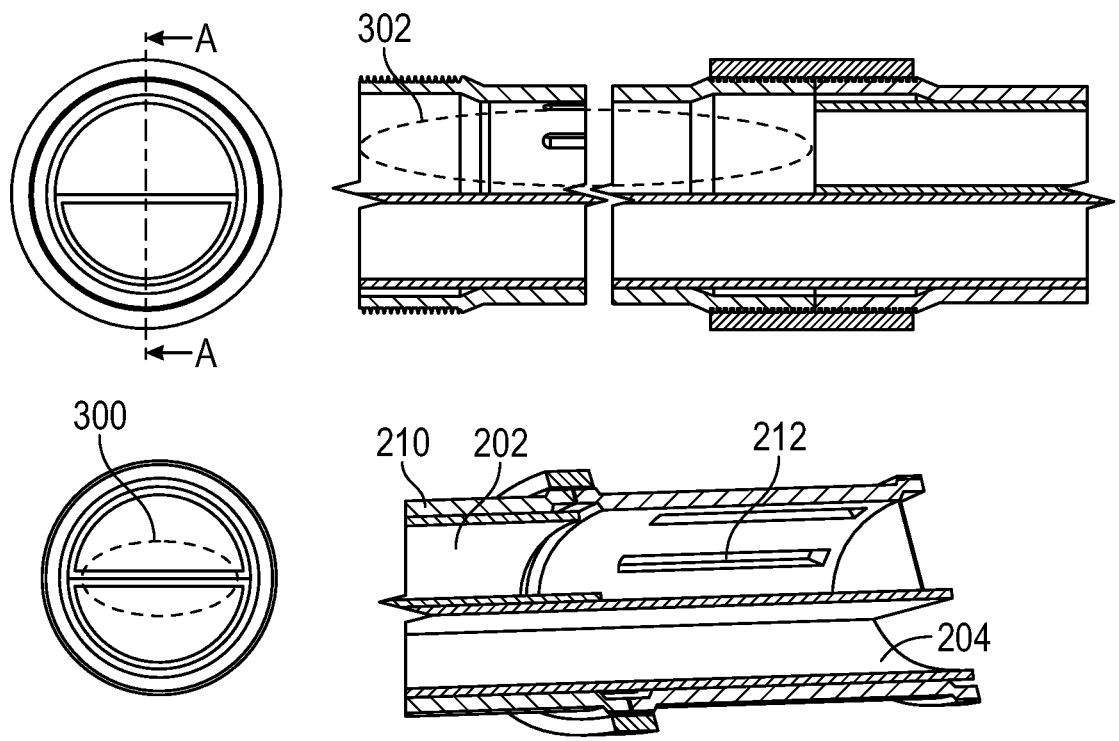
FIG. 3 illustrates various cross sectional views of the oil-gas separator of FIG. 2.

FIG. 3 illustrates various cross sectional views, such as longitudinal (right) and lateral (left) cross sectional views, of oil-gas separator 200 of FIG. 2. The offset area or void area 302 formed by first and second fluid channels 202, 204 is shown in greater detail, along with the orientation of perforations 212 and end cap 214 relative to the fluid channels. The first 202 and second 204 fluid channels share a common wall 300 in non-offset areas.

Figure 4:
FIG. 4 is a photograph of a fully assembled oil-gas separator, according to an embodiment.
Figure 5:
FIG. 5 is a photograph showing an end perspective view of the oil-gas separator of FIG. 4.

FIG. 4 is a photograph of a fully assembled oil-gas separator, according to an embodiment. FIG. 5 is a photograph showing an end perspective view of the oil-gas separator of FIG. 4. An end cap and perforations are clearly visible.

STATEMENTS REGARDING INCORPORATION BY REFERENCE AND VARIATIONS

All references cited throughout this application, for example patent documents including issued or granted patents or equivalents; patent application publications; and non-patent literature documents or other source material; are hereby incorporated by reference herein in their entireties, as though individually incorporated by reference, to the extent each reference is at least partially not inconsistent with the disclosure in this application (for example, a reference that is partially inconsistent is incorporated by reference except for the partially inconsistent portion of the reference).

The terms and expressions which have been employed herein are used as terms of description and not of limitation, and there is no intention in the use of such terms and expressions of excluding any equivalents of the features shown and described or portions thereof, but it is recognized that various modifications are possible within the scope of the invention claimed. Thus, it should be understood that although the invention has been specifically disclosed by preferred embodiments, exemplary embodiments and optional features, modification and variation of the concepts herein disclosed can be resorted to by those skilled in the art, and that such modifications and variations are considered to be within the scope of this invention as defined by the appended claims. The specific embodiments provided herein are examples of useful embodiments of the invention and it will be apparent to one skilled in the art that the invention can be carried out using a large number of variations of the devices, device components, and method steps set forth in the present description. As will be apparent to one of skill in the art, methods and devices useful for the present methods and devices can include a large number of optional composition and processing elements and steps. All art-known functional equivalents of materials and methods are intended to be included in this disclosure. Nothing herein is to be construed as an admission that the invention is not entitled to antedate such disclosure by virtue of prior invention.

When a group of substituents is disclosed herein, it is understood that all individual members of that group and all subgroups are disclosed separately. When a Markush group or other grouping is used herein, all individual members of the group and all combinations and subcombinations possible of the group are intended to be individually included in the disclosure.

It must be noted that as used herein and in the appended claims, the singular forms "a", "an", and "the" include plural reference unless the context clearly dictates otherwise. Thus, for example, reference to "a fastener" includes a plurality of such fasteners and equivalents thereof known to those skilled in the art, and so forth. As well, the terms "a" (or "an"), "one or more" and "at least one" can be used interchangeably herein. It is also to be noted that the terms "comprising", "including", and "having" can be used interchangeably. The expression "of any of claims XX-YY" (wherein XX and YY refer to claim numbers) is intended to provide a multiple dependent claim in the alternative form, and in some embodiments is interchangeable with the expression "as in any one of claims XX-YY."

Unless defined otherwise, all technical and scientific terms used herein have the same meanings as commonly understood by one of ordinary skill in the art to which this invention belongs. Although any methods and materials similar or equivalent to those described herein can be used in the practice or testing of the present invention, the preferred methods and materials are described.

Whenever a range is given in the specification, for example, a range of integers, a temperature range, a time range, a composition range, or concentration range, all intermediate ranges and subranges, as well as all individual values included in the ranges given are intended to be included in the disclosure. As used herein, ranges specifically include the values provided as endpoint values of the range. As used herein, ranges specifically include all the integer values of the range. For example, a range of 1 to 100 specifically includes the end point values of 1 and 100. It will be understood that any subranges or individual values in a range or subrange that are included in the description herein can be excluded from the claims herein.

As used herein, "comprising" is synonymous and can be used interchangeably with "including," "containing," or "characterized by," and is inclusive or open-ended and does not exclude additional, unrecited elements or method steps. As used herein, "consisting of" excludes any element, step, or ingredient not specified in the claim element. As used herein, "consisting essentially of" does not exclude materials or steps that do not materially affect the basic and novel characteristics of the claim. In each instance herein any of the terms "comprising", "consisting essentially of" and "consisting of" can be replaced with either of the other two terms. The invention illustratively described herein suitably can be practiced in the absence of any element or elements, limitation or limitations which is/are not specifically disclosed herein.

What is claimed is:

1. An oil-gas separator for use in a tubing string located in a borehole of a well, the oil-gas separator comprising:
    a first fluid channel for receiving a well fluid, the first fluid channel having an open proximal end, a sealed distal end, and a plurality of perforations in a distal portion of the first fluid channel's exterior wall for expelling well fluid comprising oil and entrained gas into an annular space between the oil-gas separator and a well casing to produce gas-reduced oil; and
    a second fluid channel for receiving the gas-reduced oil, the second fluid channel having a sealed proximal end, an open distal end for expelling the gas-reduced oil to the Earth's surface, and a plurality of perforations in a proximal portion of the second fluid channel's exterior wall for receiving fluid from the annular space;
    wherein the proximal ends of the first and the second fluid channels are coterminous; and
    wherein the oil-gas separator does not comprise an adapter including a first inlet hole in fluid communication with the first fluid channel and a second inlet hole in fluid communication with the second fluid channel.

2. The oil-gas separator of claim 1, wherein the first fluid channel's exterior wall and the second fluid channel's exterior wall are formed by a sheath.

3. The oil-gas separator of claim 2, wherein the sheath is a multi-part sheath.

4. The oil-gas separator of claim 3, wherein the plurality of perforations in the distal portion and/or the plurality of perforations in the proximal portion are within a pup joint of the multi-part sheath.

5. The oil-gas separator of claim 1, wherein the first fluid channel and the second fluid channel are non-concentric with respect to one another.

6. The oil-gas separator of claim 5, wherein the first fluid channel and the second fluid channel share a common wall.

7. The oil-gas separator of claim 1, wherein the first fluid channel and the second fluid channel each have D-shaped lateral cross sections.

8. The oil-gas separator of claim 1, wherein an average flow rate out of the second fluid channel is between 2250 bbl/day and 10,000 bbl/day.

9. A method of using an oil-gas separator to remove gas from a well fluid, the method comprising:
   flowing well fluid from below a barrier in a well into a first fluid channel of an oil-gas separator;
   causing the well fluid to be discharged from a plurality of perforations in a distal portion of an exterior wall of the first fluid channel and to flow downward, due to gravity, into an annular space between the oil-gas separator and an internal wall of a well casing, thereby releasing some of the gas contained within the well fluid to produce gas-reduced oil;
   flowing the gas-reduced oil from the annular space into a plurality of perforations in a proximal portion of a second fluid channel of the oil-gas separator; and
   delivering the gas-reduced oil to the Earth's surface through the second fluid channel;
   wherein proximal ends of the first and the second fluid channels are coterminous; and
   wherein the oil-gas separator does not comprise an adapter including a first inlet hole in fluid communication with the first fluid channel and a second inlet hole in fluid communication with the second fluid channel.

10. The method of claim 9, wherein distal ends of the first and the second fluid channels are coterminous.

11. The method of claim 9, wherein the first fluid channel's exterior wall and the second fluid channel's exterior wall are formed by a sheath.

12. The method of claim 11, wherein the sheath is a multi-part sheath.

13. The method of claim 12, wherein the plurality of perforations in the distal portion and/or the plurality of perforations in the proximal portion are within a pup joint of the multi-part sheath.

14. The method of claim 9, wherein the first fluid channel and the second fluid channel are non-concentric with respect to one another.

15. The method of claim 14, wherein the first fluid channel and the second fluid channel share a common wall.

16. The method of claim 9, wherein the first fluid channel and the second fluid channel each have D-shaped lateral cross sections.

17. The method of claim 9, wherein an average flow rate out of the second fluid channel is between 2250 bbl/day and 10,000 bbl/day.

18. The oil-gas separator of claim 1, wherein the distal ends of the first and the second fluid channels are coterminous.

* * * * *